United States Patent
Hoeffel et al.

(10) Patent No.: US 7,574,292 B2
(45) Date of Patent: Aug. 11, 2009

(54) METHOD AND SYSTEM FOR CALIBRATING A VEHICLE SPEED

(75) Inventors: James J Hoeffel, Lake Orion, MI (US); David A. Basson, Clarkston, MI (US); Charles W. Kocher, II, Rochester, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 664 days.

(21) Appl. No.: 11/131,882

(22) Filed: May 18, 2005

(65) Prior Publication Data

US 2006/0265112 A1    Nov. 23, 2006

(51) Int. Cl.
    *G01M 17/00*    (2006.01)
(52) U.S. Cl. .................. 701/34; 701/216; 701/29; 340/441; 340/442; 340/444; 73/146.2; 73/146.4; 152/456; 301/5.1; 301/5.24

(58) Field of Classification Search ............... 701/216, 701/29, 34; 340/441, 442, 444; 73/146.2, 73/146.4; 152/456; 301/5.1, 5.24
See application file for complete search history.

(56) References Cited

U.S. PATENT DOCUMENTS

| | | | | |
|---|---|---|---|---|
| 5,971,597 A | * | 10/1999 | Baldwin et al. | 700/277 |
| 6,313,742 B1 | * | 11/2001 | Larson | 340/442 |
| 6,417,668 B1 | * | 7/2002 | Howard et al. | 324/426 |

* cited by examiner

*Primary Examiner*—Khoi Tran
*Assistant Examiner*—Bhavesh V Amin
(74) *Attorney, Agent, or Firm*—Ralph E. Smith

(57) ABSTRACT

A method and system for calibrating speed of a vehicle having a plurality of wheels includes a wheel speed sensor coupled to each of the wheels for providing a first vehicle speed based on an average tire size associated with the plurality of wheels. A GPS sensor provides a second vehicle speed based on a change in position of the vehicle over a predetermined period of time. A control module automatically calibrates the speed of the vehicle based on a comparison of the first and second vehicle speeds.

15 Claims, 2 Drawing Sheets

METHOD AND SYSTEM FOR CALIBRATING A VEHICLE SPEED

FIELD OF THE INVENTION

The present invention relates to a method and system for monitoring vehicle speed and more particularly to a method and system for calibrating a vehicle speed.

BACKGROUND OF THE INVENTION

Vehicle speed, as displayed on or by a vehicle speedometer, is based on wheel speed as sensed by wheel speed sensors at each wheel of the vehicle. A control module determines vehicle speed based on the number of revolutions of a wheel, as indicated by the wheel speed sensors, calculated over a predetermined period of time. The accuracy of the vehicle speed is dependent upon the accuracy of the size of the tire associated with the wheel speed sensor. Thus, since the tire size associated with the wheels is known by the manufacturer of the vehicle at the time of assembly of the vehicle, the speed of the vehicle is pre-calibrated based on the known tire size.

If a customer replaces the tires with non-standard tires, such as aggressive off-road tires or snow tires, the speedometer display can be inaccurate if the control module is not updated with the new tire size. It is possible to have the vehicle speed recalibrated upon installation of new tires, as suggested in U.S. Pat. No. 6,313,742. However, such a system requires an affirmative action taken in order to recalibrate the vehicle speed determination including actuation of the calibration system as well as the entering of specific tire data.

Thus, it is an object of the present invention to provide a method and system for automatically calibrating a vehicle speed, as may be displayed on a vehicle speedometer, to accommodate any tire size without requiring a user to initiate the calibration.

SUMMARY OF THE INVENTION

The objects, features, and advantages of the invention will be apparent from the written description that follows. The invention provides a method and system for automatically calibrating the speed of a vehicle. Wheel speed sensors coupled to each of the wheels of the vehicle provide a first vehicle speed based on an average tire size associated with the wheels. A GPS sensor provides a second vehicle speed. A control module automatically calibrates the speed of the vehicle based on a comparison of the first and second vehicle speeds, which can then be displayed on a vehicle speedometer. Automatic calibration of the vehicle speed is initiated upon ignition start of the vehicle after predetermined events have occurred.

The tire size can be updated to insure that the vehicle speed is accurate. An estimated tire size error is determined based on the first and second vehicle speeds. The estimated tire size error is compared to a predetermined error threshold. If the tire size error exceeds the error threshold, then the tire size value is corrected for future use in determining the speed of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
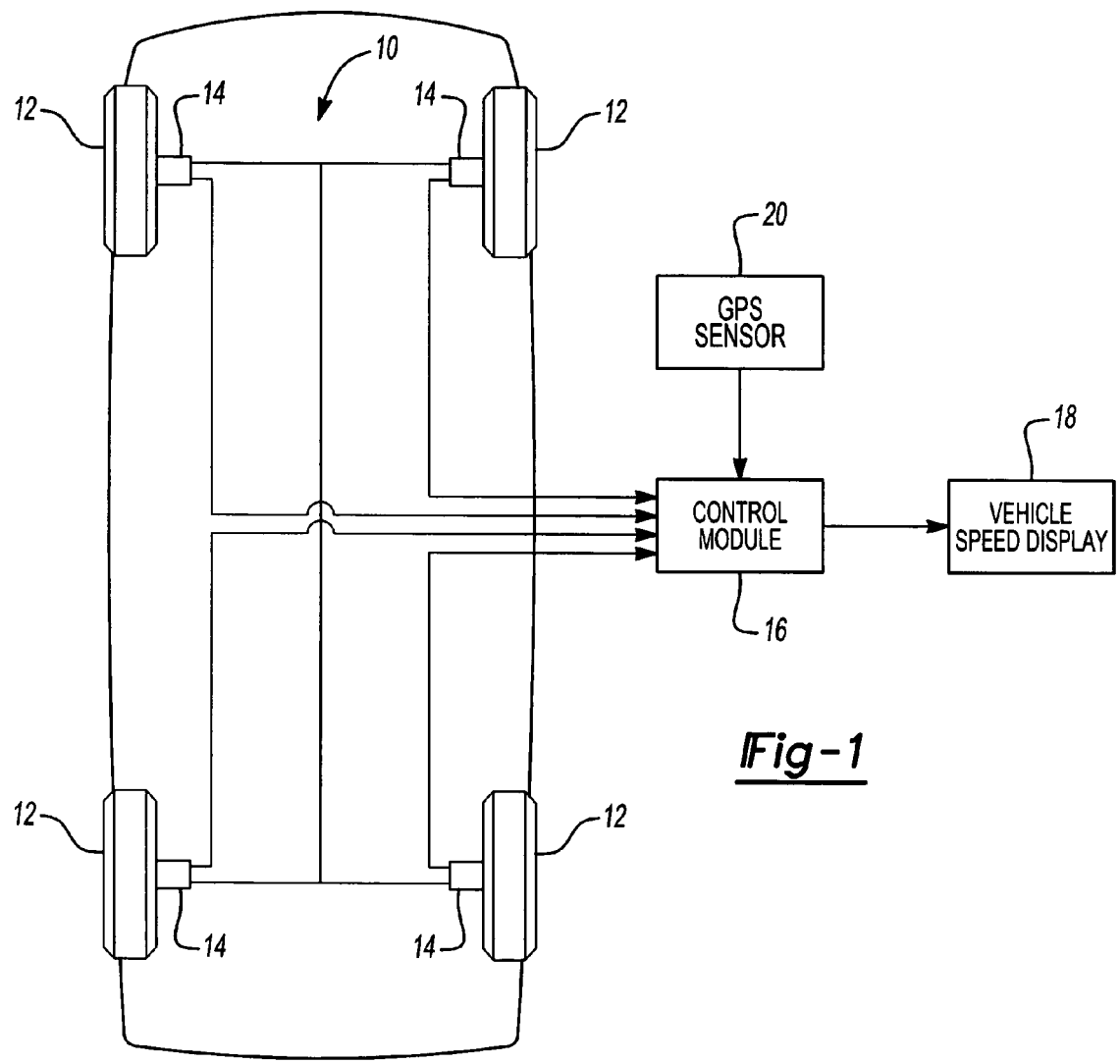
FIG. 1 is a schematic view of a vehicle incorporating the system of the present invention.

Referring now to the drawings, a preferred embodiment of the invention and its manner of use will be described. FIG. 1 illustrates a vehicle 10 to which the method and system of the invention are applied. The vehicle 10 includes a plurality of wheels 12, each having a wheel speed sensor 14 associated therewith. The wheel speed sensors 14 are in electronic communication with control module 16 for providing a speed of the vehicle 10. Vehicle speed is determined by dividing an average of the wheel speed, AvgWhlSpd, by an average tire size. Average wheel speed is determined by counting the number of revolutions of the wheels 12 as provided by the wheel speed sensors 14 over a predetermined period of time, e.g., a minute, and averaging that result over the number of wheels 12 belonging to the vehicle 10, e.g., four. The average wheel speed is then divided by the average tire size of the wheels 12 to obtain vehicle speed. A display 18 is coupled to the control module 16 for displaying the speed of the vehicle 10 to an operator of the vehicle 10.

Further coupled to the vehicle 10 is a GPS sensor 20 for use by the control module 16 in determining a second vehicle speed. GPS sensor 20 provides position information to the control module 16. Control module 16 then determines vehicle speed by dividing the change of position by a predetermined time period.

The control module 16 can then compare the two vehicle speed values to determine a tire size error. If the tire size error exceeds a predetermined threshold error, then the tire size data stored in the control module 16 is updated for future use in determining vehicle speed via the wheel speed sensors 14.

Figure 2:
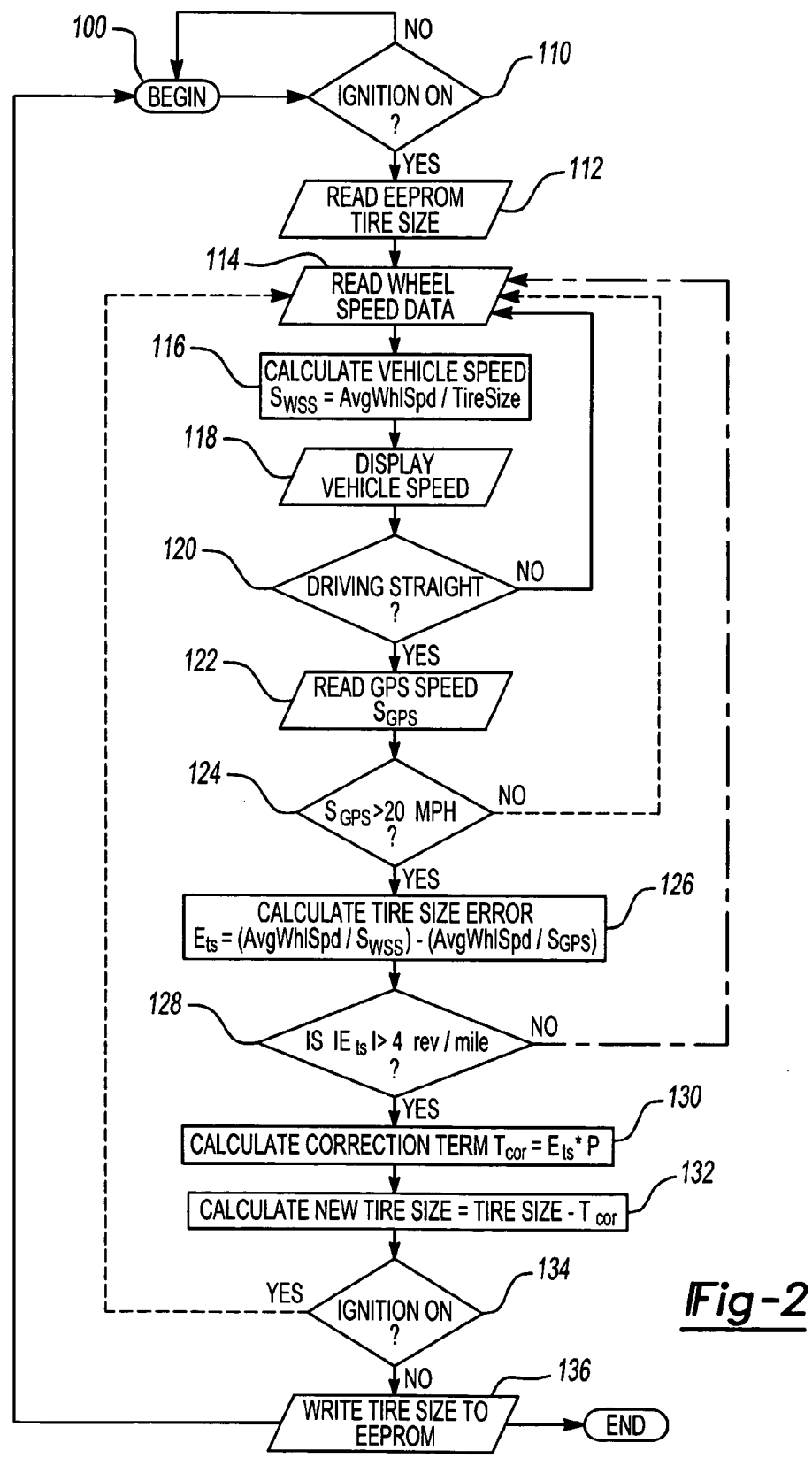
FIG. 2 is a flow chart illustrating the steps associated with the method of the present invention.

Turning now to FIG. 2, a flow chart is described illustrating one method for practicing the invention adapted to serve as an algorithm executable by control module 16. Those skilled in the art will recognize that the sequence of steps of the method is subject to considerable rearrangement without changing the essence of the processes. The method begins at step 100. It is immediately determined if the ignition is on, as indicated at step 110. If not, nothing happens. If the ignition is on, the method continues to step 112 to read the tire size value from memory. If no tire size value is available, the system has not been calibrated yet and the method will determine the tire size as described further below. In the meantime, however, a default value, such as 500 rev/mile, can be used until the tire size is learned. Alternatively, if no default value is stored, the display 18 could provide a corresponding signal, such as "Error" or "0" until the tire size is determined.

Next, at step 114, the wheel speed data is read from wheel speed sensors 14. The vehicle speed, $S_{WSS}$, is then determined at 116 by dividing the average wheel speed by the average tire size. At 118, if a display 18 is available, the vehicle speed is displayed on display 18.

The method proceeds to step 120 where it is determined if the vehicle is traveling in a straight direction. This condition must be met before the method continues in order for the calibration of the vehicle speed to be reliable. Determination of whether or not the vehicle is traveling in a straight direction can be done by determining a distance traveled by each of the wheels, i.e., the number of revolutions over a predetermined period of time, and determining if any of the distances traveled differs from any of the other values since they would be equal if traveling in a straight direction. Alternatively, if a vehicle has a steering position sensor (not shown), then an input from that sensor could be used to determine straight line direction. If a determination is made that the vehicle is traveling in a straight direction, the method proceeds to step 122 and the vehicle speed, $S_{GPS}$, is determined using the GPS sensor 20 as described above. If the vehicle is not traveling in a straight direction, the method returns to step 114.

As another measure to insure reliability of the vehicle speed calibration, at step 124, the method proceeds to determine if the vehicle is traveling reasonably, e.g., no parking lot speeds. Thus, the vehicle speed as determined by the GPS sensor 20 is compared to a predetermined speed threshold, such as 20 mph in the preferred embodiment. If the vehicle speed threshold is not exceeded, the calibration returns to step 114.

If the vehicle speed threshold is exceeded, the method proceeds to step 126 so that a tire size error, if any, can be determined. This would be the case if new tires were installed that were not equivalent in size to tires originally installed by the vehicle manufacturer and pre-calibrated into the control module 16. Tire size error, $E_{TS}$, is determined according to the following, $E_{TS}$=(Average Wheel Speed/$S_{WSS}$)−(Average Wheel Speed/$S_{GPS}$).

The tire size error is compared to a predetermined threshold at step 128. In the preferred embodiment, the threshold is 4 revolutions/mile. If the tire size error does not exceed the threshold, the method returns to step 114. If, on the other hand, the tire size error does exceed the threshold, then a tire size correction term, $T_{COR}$, is determined at step 130 by multiplying the tire size error by a proportional control, e.g., 5%. It is preferable to adjust the new tire size over several passes of the algorithm rather than immediately in one step, therefore, only 5% of the error is corrected during each pass of the method. Thus, any single GPS reading that may be in error is filtered out.

The new tire size value is then determined at 132 by subtracting the tire size correction term to the original tire size. The method then returns to step 114 and repeats the process if the ignition remains on as indicated at step 134. If the ignition is turned off, the new tire size value is stored in memory and the method ends until the ignition is turned back on. Thus, the vehicle speed is constantly recalibrated to take into consideration tire sizes that may not be standard to the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for calibrating speed of a vehicle having a plurality of wheels, the system comprising:
    a wheel speed sensor coupled to each of the wheels for providing a first vehicle speed based on an average tire size associated with the plurality of wheels;
    a GPS sensor for providing a second vehicle speed; and
    a control module configured to automatically calibrate a speed of the vehicle by (a) sensing an ignition on of the vehicle, (b) comparing the first and second vehicle speeds, (c) calibrating the speed of the vehicle by calculating an adjustment to the average tire size as a function of the first and second vehicle speed comparison, and (d) automatically repeating (b)-(d) so long as the ignition of the vehicle remains on.

2. The system as recited in claim 1 further comprising a vehicle speed display for displaying the calibrated speed of the vehicle, wherein the first vehicle speed comprises a measured vehicle speed and the second vehicle speed comprises an actual vehicle speed, and wherein calibrating the speed of the vehicle comprises calculating a new average tire size as a function of a difference in measured vehicle speed versus actual vehicle speed.

3. The system as recited in claim 1 wherein the control module, in automatically calibrating the speed of the vehicle, is further configured to automatically calibrate a speed of the vehicle by:
    (i) determining a tire size error based on the first and second vehicle speeds;
    (ii) comparing the tire size error to a predetermined threshold error; and
    (iii) calculating a new average tire size if the tire size error exceeds the predetermined threshold error.

4. The system as recited in claim 1 wherein the control module, in automatically calibrating the speed of the vehicle, is further provided for determining if the vehicle is traveling in a straight direction.

5. The system as recited in claim 4 wherein the control module, in determining if the vehicle is traveling in a straight direction, further comprises:
    determining a traveled wheel distance of each of the wheels of the vehicle; and
    determining if any one of the traveled wheel distances differs from any one of the other traveled wheel distances.

6. The system as recited in claim 4 wherein the control module, in automatically calibrating the speed of the vehicle, is further provided for determining if the second vehicle speed exceeds a predetermined threshold speed.

7. A method for calibrating speed of a vehicle having a plurality of wheels, the method comprising:
    sensing a first vehicle speed based on an average tire size associated with the plurality of wheels;
    sensing a second vehicle speed based on global positioning data; and
    automatically calibrating the speed of the vehicle by (a) Sensing an ignition of the vehicle;
    (b) Comparing the first and second vehicle speeds;
    (c) Calculating a new average tire size correction as a function of the first and the second vehicle speeds comparison.

8. The method as recited in claim 7 further comprising displaying the calibrated speed of the vehicle.

9. The method as recited in claim 7 wherein the step of automatically calibrating the speed of the vehicle further comprises the steps of:
    calculating a tire size error based on the first and second vehicle speed; comparing the tire size error to a predetermined threshold error; and
    calculating a new average tire size if the tire size error exceeds the predetermined threshold error.

10. The method as recited in claim 7 wherein the step of automatically calibrating the speed of the vehicle further includes the step of determining if the vehicle is traveling in a straight direction.

11. The method as recited in claim 10 wherein the step of determining if the vehicle is traveling in a straight direction further comprises the steps of:
   determining a traveled wheel distance of each of the wheels of the vehicle; and
   determining if any one of the traveled wheel distances differs from any one of the other traveled wheel distances.

12. The method as recited in claim 10 wherein the step of automatically calibrating the speed of the vehicle further includes the step of determining if the second vehicle speed exceeds a predetermined threshold speed.

13. A method for calibrating speed of a vehicle having a plurality of wheels, the method comprising:
   (a) sensing a first vehicle speed based on an average tire size associated with the plurality of vehicle wheels;
   (b) sensing a second vehicle speed based on global positioning data;
   (c) calculating a vehicle tire size error using the first and second vehicle speeds;
   (d) comparing the calculated vehicle tire size error against a predetermined vehicle tire size error threshold;
   (e) calculating a vehicle tire size error correction term using the calculated vehicle tire size error if the predetermined vehicle tire size error threshold is exceeded; and
   (f) calculating a new average tire size using the vehicle tire size error correction term if the predetermined vehicle tire size error threshold was exceeded.

14. The method as recited in claim 13 wherein steps (a)-(f) are performed when the ignition is on.

15. The method as recited in claim 14 wherein steps (a)-(f) are repeated when the ignition is on.

* * * * *